United States Patent
Marshall et al.

(10) Patent No.: US 6,200,002 B1
(45) Date of Patent: Mar. 13, 2001

(54) LUMINAIRE HAVING A REFLECTOR FOR MIXING LIGHT FROM A MULTI-COLOR ARRAY OF LEDS

(75) Inventors: Thomas M. Marshall, Hartsdale; Michael D. Pashley, Cortlandt Manor; Stephen Herman, Monsey; Jeffrey A. Shimizu, Cortlandt Manor, all of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/277,645

(22) Filed: Mar. 26, 1999

(51) Int. Cl.[7] .................................................. F21V 7/00
(52) U.S. Cl. ............................ 362/231; 362/235; 362/296
(58) Field of Search ..................................... 362/551, 555, 362/583, 230, 231, 235, 293, 296

(56) References Cited

U.S. PATENT DOCUMENTS

| | | | |
|---|---|---|---|
| 4,964,025 | 10/1990 | Smith | 362/346 |
| 5,255,171 * | 10/1993 | Clark | 362/231 |
| 5,758,951 * | 6/1998 | Haitz | 362/231 |
| 5,810,463 * | 9/1998 | Kawahara et al. | 362/555 |
| 5,921,652 * | 7/1999 | Parker et al. | 362/231 |

* cited by examiner

Primary Examiner—Thomas M. Sember
(74) Attorney, Agent, or Firm—F. Brice Faller

(57) ABSTRACT

A light source includes an array of LEDs in each of a plurality colors such as red, green, and blue in the entrance aperture of a tubular reflector which preferably has convex walls facing the optic axis and flares outward toward the exit aperture, and preferably has a polygonal cross section such as a square. Mixing of colors is further promoted by utilizing a large number of small LEDs with the LEDs of each color being centered on the optic axis.

19 Claims, 9 Drawing Sheets

LUMINAIRE HAVING A REFLECTOR FOR MIXING LIGHT FROM A MULTI-COLOR ARRAY OF LEDS

BACKGROUND OF THE INVENTION

This invention relates to a luminaire having a reflector which mixes light from a multi-color array of LEDs, and more particularly to a spotlight which generates white light from such an array.

The standard light source for small to moderate size narrow beam lighting for accent lighting and general illumination is the incandescent/halogen bulb, such as a PAR (parabolic aluminized reflector) lamp. These sources are compact and versatile, but they are not very efficient. A given lamp operates at a given color temperature for a fixed power, and while they are dimmable, the color temperature shifts with applied power according to the blackbody law, which may or may not be the variation that the user desires.

An array of LEDs in a each of a plurality of colors offers the possibility of creating a luminaire in which the color temperature may be controlled at any power level, thereby enabling lamp which is dimmable and emits a uniformly white light at any power level.

The English language abstract of JP-A-06 237 017 discloses a polychromatic light emitting diode lamp having a 3×3 array of light emitting diodes of two types, a first type having elements for emitting red light and blue light, and a second type having elements for emitting red light and green light. The stated object is to mix colors so that the mixed color would be recognized as the same color in any direction, but there are no optical provisions to facilitate mixing. It is simply a two-dimensional array of LEDs in a lamp case filled with resin, which would do little more than provide some diffusion.

WO 98/16777 discloses a signal lamp having an array of LEDs in a single color for the purpose of signaling, e.g. a traffic light. A rotationally symmetric housing surrounds the array, but diverges so that the light from the LEDs is transmitted to a collimating Fresnel lens without reflection. If the single-color LEDs were replaced by a multi-colored array, the lens would image the individual LEDs without mixing the colors.

SUMMARY OF THE INVENTION

It is an object of the invention to provide an LED light source that will provide all of the desirable features of PAR lamps, plus the ability to vary and control color temperature, at full power and dimmed, all at greater luminous efficacy.

It is a further object of the invention to provide good color mixing for an extended size of array of LEDs.

It is a still further object to provide a collimated beam of mixed light emerging from the light source.

The light source according to the invention utilizes an array of LEDs, including at least one LED in each of a plurality of colors, for emitting light in each of the plurality of colors. The array is arranged in the entrance aperture of a reflecting tube having an opposed exit aperture from which light is emitted after being reflected and mixed by a circumferential wall extending between the apertures. The light source has an optic axis extending between said apertures centrally of the circumferential wall, and a cross-section transverse to the axis.

According to a preferred embodiment, the cross-section is non-round along at least a part of the optic axis. The cross-section is preferably polygonal along the entire length of the axis. Square and octagonal cross-sections have been found to be suitable for mixing light from the various colors.

It is also preferable for the circumferential wall to diverge from the entrance aperture to the exit aperture, whereby the exit aperture is larger than the entrance aperture. The circumferential wall, seen from the optic axis, preferably has a convex shape, and preferably flares outward toward the exit aperture. That is, the radius of curvature of the wall decreases toward the exit aperture, making the reflector somewhat horn-shaped.

The invention is based on three basic principles. First, that mixing is the opposite of imaging; second, that mixing can be relatively efficient; and third, that it is easier to mix a wide beam than a narrow one.

In an ideal imaging system, each point in the object plane is mapped to a separate point in the image plane. Ideally, no mixing occurs, and in practice this is true on a scale down to the resolution limit of the system. A parabolic reflector retains a certain amount of correlation between input and output, because both its longitudinal shape and its cross-sectional shape contribute to imaging.

A parabolic longitudinal shape converges incident parallel rays upon reflection, and renders diverging incident rays less divergent, rays from a single point being reflected in parallel. Any concave shape looks like a parabola (locally). Conversely, if the longitudinal shape is convex (e.g. horn-shaped) then the incident rays will tend to diverge upon reflection, and nearby input points will tend to be mapped to more distant output points.

A circular cross-section preserves the azimuthal identity of the incident rays. That is, the difference in azimuthal angle between incident and reflected rays is the same, independent of the incident azimuth (in a given longitudinal plane). With a polygonal cross-section, on the other hand, the azimuthal difference varies strongly with the incident azimuth.

To illustrate these principles, four sets of simulations represented in FIGS. 1a to 4b were performed using the ray-tracing program ASAP. FIGS. 1 and 2 represent light distributions from reflectors having parabolic longitudinal shapes with the z-axis as the optic axis, focal points (0,0,0), and a 10 mm aperture in the plane z=0. FIGS. 3 and 4 represent light distributions from reflectors having convex longitudinal shapes similar to the preferred horn design with a 10 mm entrance aperture in the plane z=0. FIGS. 1 and 3 represent round cross sections, while FIGS. 2 and 4 represent square cross sections. In FIGS. 1a to 4a the light source is at x=0, and in FIGS. 1b to 4b the light source is at x=3 mm. The source emitted a wide Lambertian cone (cone angle 80°) parallel to the z-axis. The light distribution in each figure is simulated in a plane 0.5 m from a point source at z=0, a dot in each field marking the center of the optic axis.

The round parabola of FIG. 1 shows the strongest imaging, the distribution becoming progressively worse as the source moves off axis (in each case simulations were run at x=0, 1, 2, 3, and 4 mm, the figures representing only x=0 and 3 mm). The square parabola of FIG. 2 produces broader images that are qualitatively more similar to each other than is the case in FIG. 1. Nevertheless there are strong features (lines) and abrupt intensity changes (checkerboards) that do not line up with each other in the progression as the point source moves off-axis.

The round horn of FIG. 3 shows the strong angular imaging of a circular cross-section, but the more slowly varying broad background of the horn shape. The square horn of FIG. 4 still exhibits residual structure, but the relative intensity differences are minimal, at first glance giving the impression of a featureless distribution. For the stated goal of color mixing from spatially discrete sources, the square horn geometry gives the best results.

The principle that mixing can be relatively efficient must be considered against the notion that the degree of mixing is proportional to the number of reflections N. For a long reflecting tube mixing is good but efficiency is low, because if the reflectivity of the circumferential wall is R, then the transmitted intensity for the ray is $R^N$. The reflector shapes according to the invention minimize the number of reflections while maximizing mixing due to the convex shape and the azimuthal shift of reflected rays afforded by the polygonal cross-section.

For the principle that mixing is better for a wide beam than for a narrow one, consider a straight walled tube of length L and side length A. At a given aspect ratio (L/A), the design mixes best for wide angle sources, since the average N is larger. If the size of the exit aperture increases, keeping the sidewalls planar (but sloped), the average emission angle decreases, as does the average N. However this trend does not continue indefinitely, because the angular distribution of non-reflected rays increases, until they eventually dominate the output distribution.

To summarize, the preferred embodiment of the invention utilizes an array of LEDs which fills the entrance aperture of a horn-shaped reflector having a polygonal cross-section.

DETAILED DESCRIPTION OF THE PREFERRED EMBODIMENTS

Figure 1A:
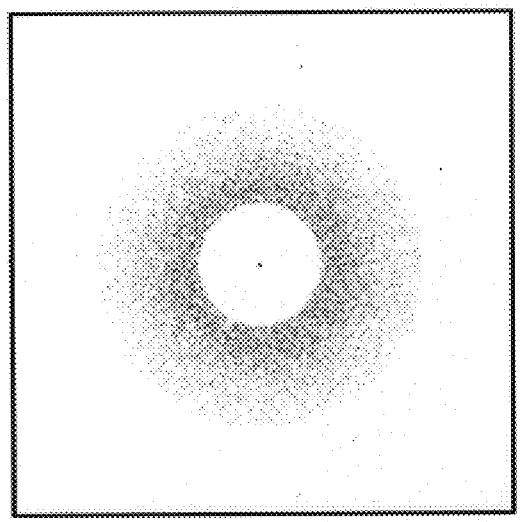
FIG. 1a illustrates light distribution from a parabolic reflector with a round cross-section, and a point source at its focal point.
Figure 1B:
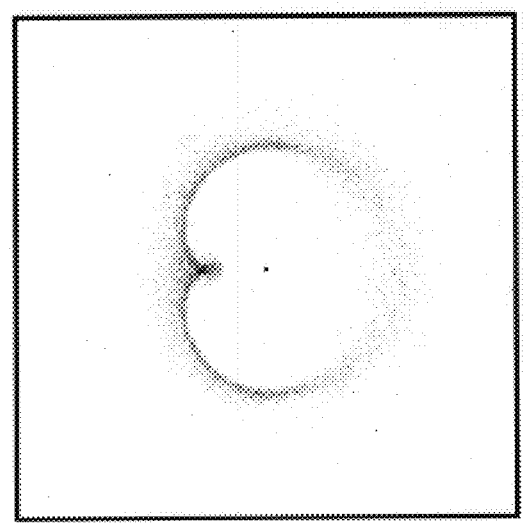
FIG. 1b illustrates the distribution with the point source offset from the focal point.
Figure 2A:
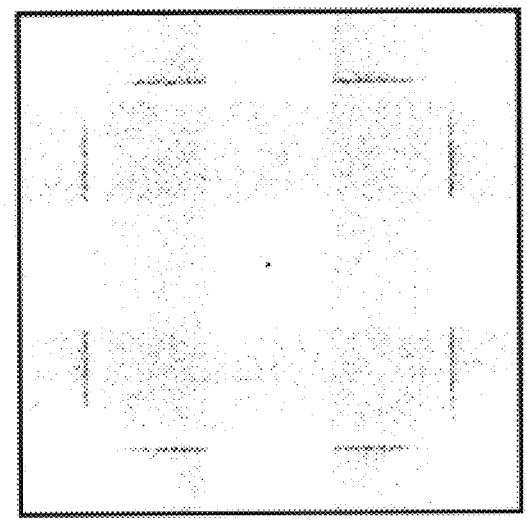
FIG. 2a illustrates light distribution from a parabolic reflector with a square cross-section and a point source at its focal point.
Figure 2B:
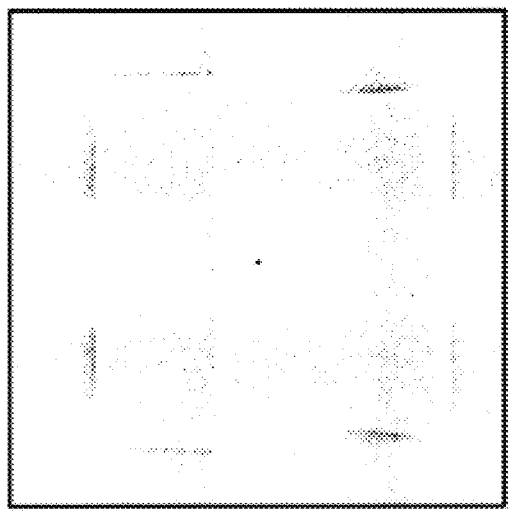
FIG. 2b illustrates the distribution with the point source offset from the focal point.
Figure 3A:
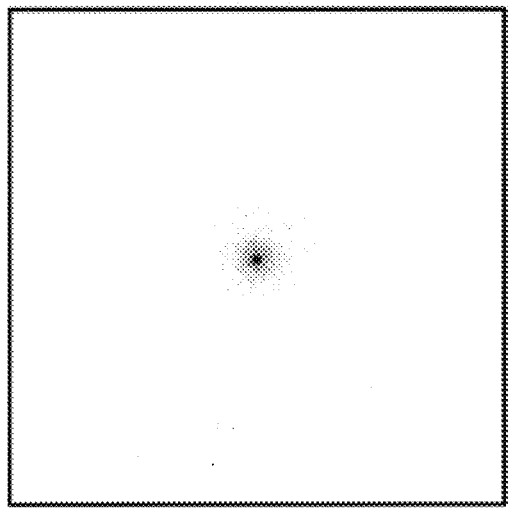
FIG. 3a illustrates light distribution from a horn with a round cross-section and a point source centered in the entrance aperture.
Figure 3B:
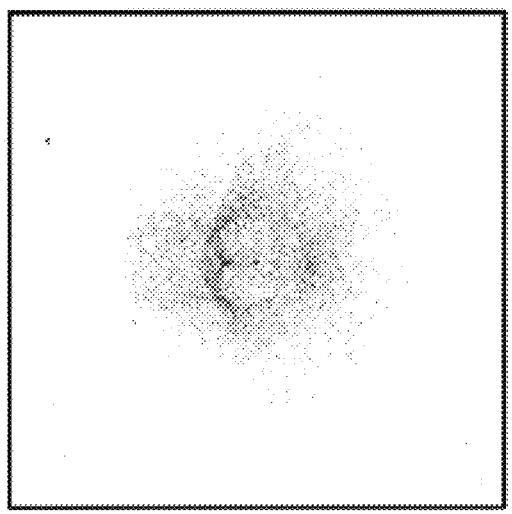
FIG. 3b illustrates light distribution with the point source offset in the entrance aperture.
Figure 4A:
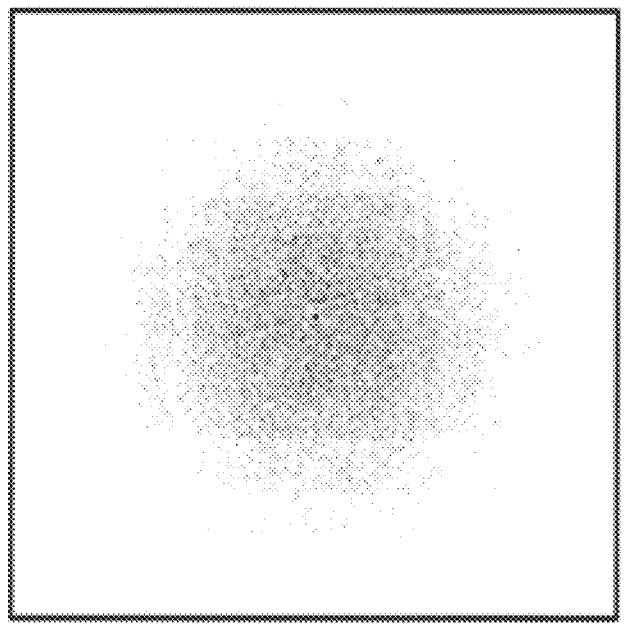
FIG. 4a illustrates light distribution from a horn with a square cross-section and a point source centered in the entrance aperture.
Figure 4B:
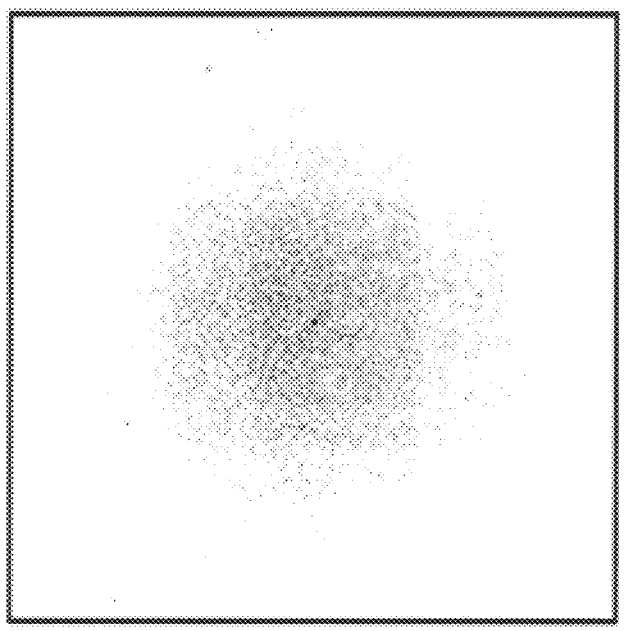
FIG. 4b illustrates the distribution with the point source offset in the entrance aperture.
Figures 5, 6:
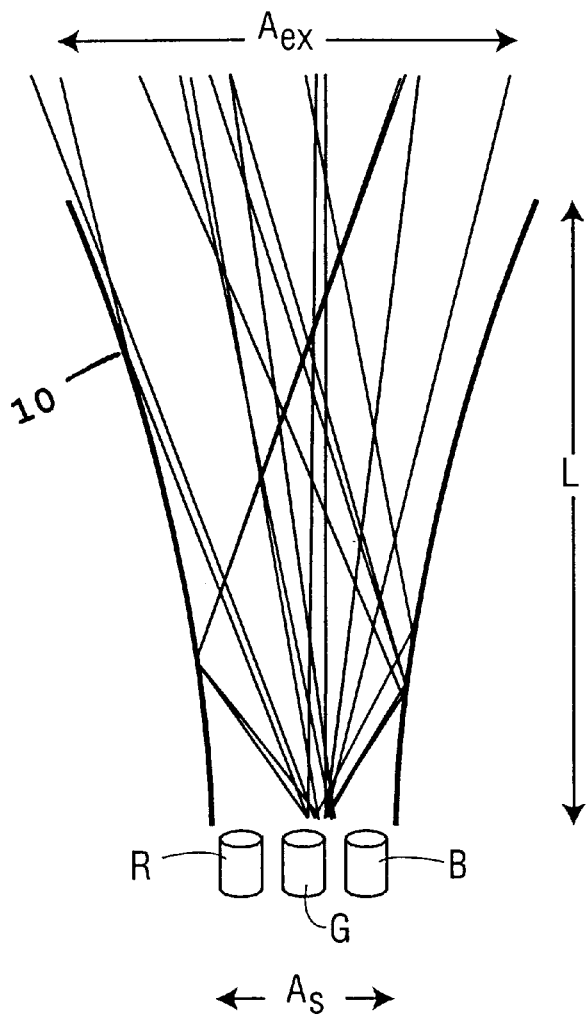
FIG. 5 is a schematic showing the horn dimensions and light mixing.
FIG. 6 is a schematic plan view of a hexagonal array of eighteen LEDs in red, green, and blue.

FIG. 5 illustrates the dimensions of the horn reflector used for the simulations illustrated in FIGS. 7–11. This horn has a side length L along the optic axis (the z-axis) of 100 mm, a square exit aperture of side length $A_{ex}$=75 mm, and a square entrance aperture of side length $A_s$=30 mm. While no ideal shape for the tubular reflector 10 has been determined, for purposes of the ASAP ray tracing simulation the walls are defined in the xz-plane according to the following fourth order polynomial:

$$Z = \sqrt{225 + 1.996x + 3.034 \times 10^{-2} x^2 + 3.345 \times 10^{-4} x^3 + 3.438 \times 10^{-6} x^4}$$

The general features of the curve are that the walls are nearly parallel adjacent to the entrance to promote mixing, and then flare outward to narrow the beam as a whole.

The simulations were done assuming pure specular reflection, but the prototypes utilized specular-plus-diffuse reflecting material, specifically, a foil having about 90% reflection. An alternative would be to make the reflector body a solid transparent piece, with reflective coating applied to the outer wall as needed. Such a design might take advantage of TIR (total internal reflection), and thus be more efficient. In any event, the reflective property is a design parameter which can be used to enhance mixing.

What is referred to herein as an array of LEDs is actually an array of injectors, wherein each injector is a package of one or more LED chips plus primary optics which determine the emission pattern. The examples utilize truncated Lambertian emission of cone semi-angle $\theta_s$=50° (total cone angle 100°), with the cone axis parallel to the z-axis. However each injector axis may be inclined to the z-axis by a polar angle $\psi_s$, with an azimuthal orientation $100_s$.

The injectors are preferably arranged in patterns having the following properties as viewed in the x-y plane; (1) each source color distribution (R, G, and B) has its center of gravity lying on the optic axis, and (2) each source color distribution has the same mean radial distance from the optic axis. For the prototype, where the required ratio of colors R:G:B is 2:3:1, satisfactory results were achieved with the hexagonal array of FIG. 6. However for the simulations utilizing square arrays, as will be apparent from FIGS. 7a, 11a, and 12a, the second property is difficult to precisely achieve.

The light distribution images which follow were generated by running a separate simulation analysis in ASAP for each of the three LED source colors, and placing the spatial distribution results into the three channels of a standard RGB bitmap. If mixing is perfect, then each pixel has the same values for the R, G, and B channels, and the image appears pure monochrome. If there are differences in the color channels, i.e., imperfect mixing, then the image contains shades of color. While FIGS. 7b and 9b to 12b appear in black and white herein, variations in shading in the originals will be described.

Figure 7A:
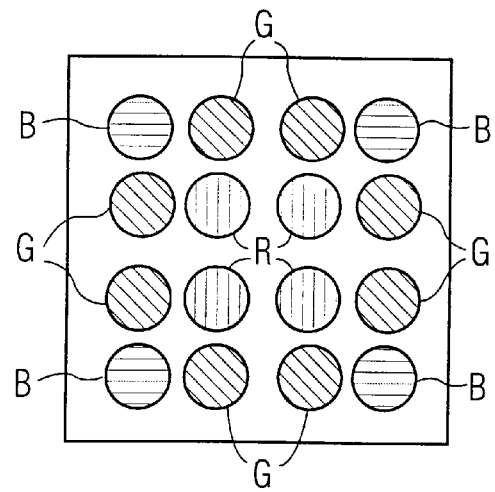
FIG. 7a is a plan view of a square array of sixteen LEDs.
Figure 7B:
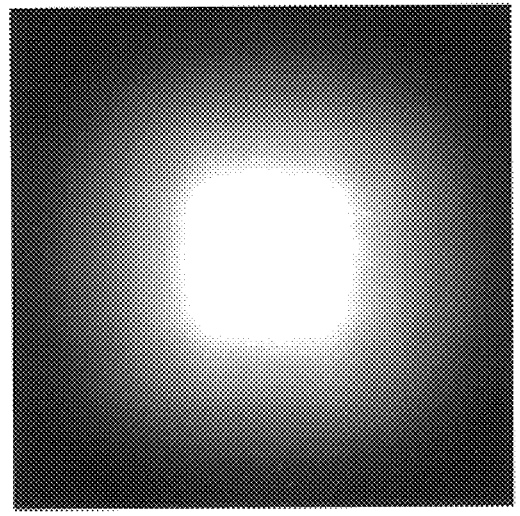
FIG. 7b illustrates the resulting light distribution for the array of FIG. 7a in a horn reflector with square cross-section.

FIG. 7b shows the light distribution for the basic square horn, with sixteen LEDs arranged in the square array of FIG. 7a in the entrance aperture. The output distribution has an angular width of 2×20°. The quality of mixing is good, i.e., the original has a substantially monochrome appearance which would require very little diffusion.

Figure 8:
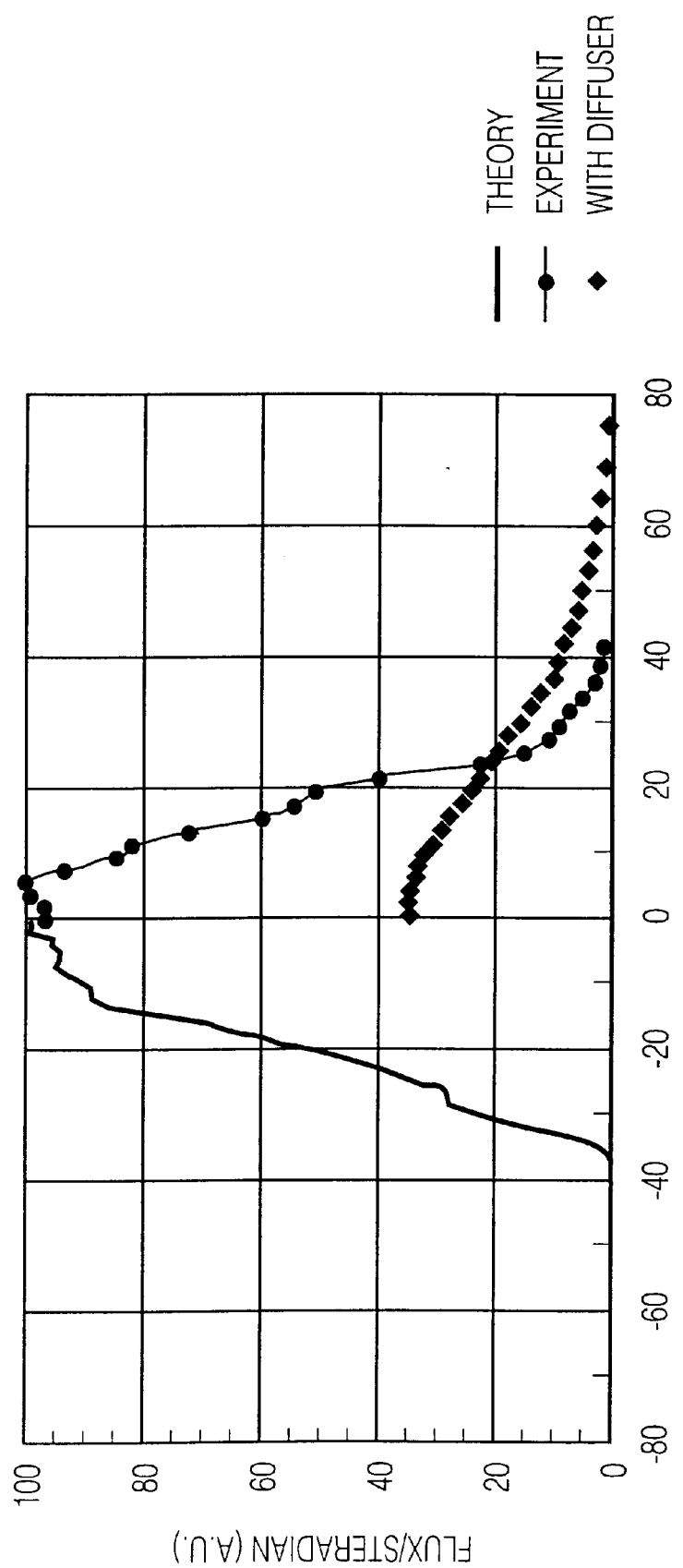
FIG. 8 is a plot illustrating the calculated and measured light distribution as a function of angle from the optic axis, corresponding to FIGS. 7a and 7b.

FIG. 8 shows the calculated and measured angular distribution. For the prototype, the mixing was not quite as good as for the ASAP model, when no diffuser was used. The use of a diffuser greatly improved the color mixing, but at the cost of increased beam width (2×30°, as can be seen in the figure).

Figure 9A:
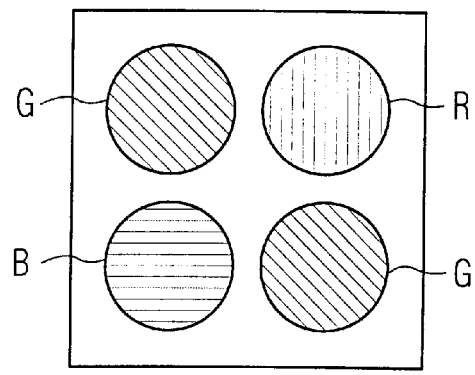
FIG. 9a is a plan view of a square array of four large LEDs filling the entrance aperture.
Figure 9B:
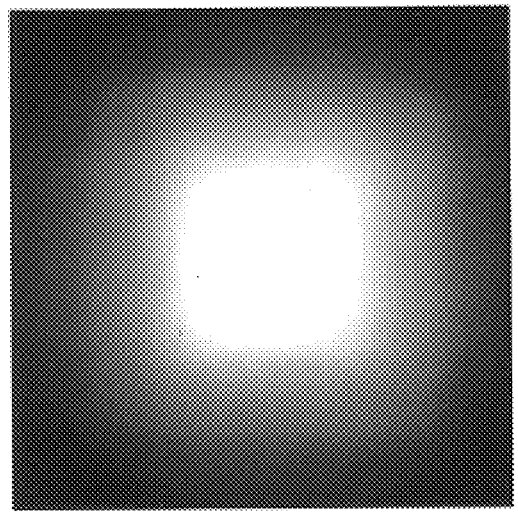
FIG. 9b illustrates the resulting light distribution.

FIG. 9b shows the light distribution for the basic square horn, with four LEDs arranged in the square array of FIG. 9a. While the center is reasonably good quality white, there are strong color artifacts at the edges. Specifically, the lower left corner and adjacent edges are blue, while the upper right is red. Since two greens are needed, the green artifacts are less, but are visible at the upper left and lower right corners. A diffuser strong enough to correct this flaw would broaden the beam to almost 2×90°, wherefore such a configuration is considered poor. It is safe to conclude that for a given total source area, a large number of small, interspersed sources perform better than a smaller number of larger sources.

Figure 10A:
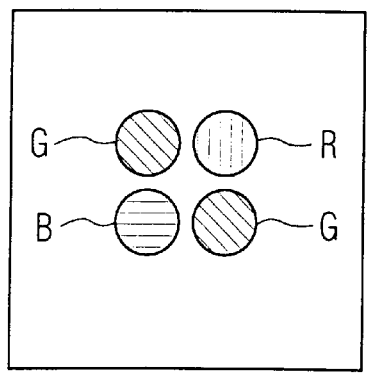
FIG. 10a is a plan view of a square array of four small LEDs centered in the entrance aperture.
Figure 10B:
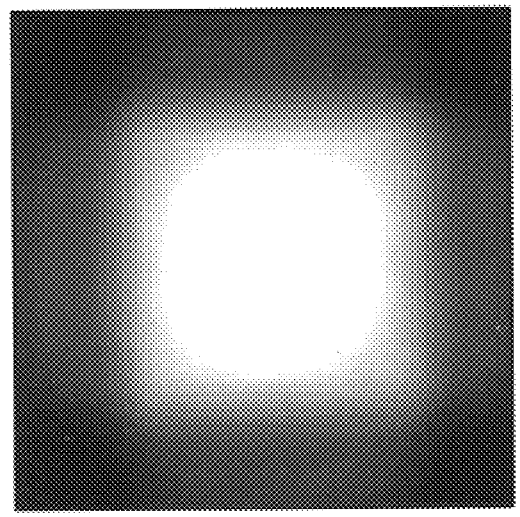
FIG. 10b illustrates the resulting light distribution.

FIG. 10b shows the light distribution for the basic square horn, with four LEDs arranged in the square array of FIG. 10a. These have the same symmetry as in FIG. 9a, but are smaller LEDs, and are clustered at the center of the entrance aperture. The color mixing is better than for the four large LEDs of FIG. 9a, but the mixing is still not as good as for the sixteen small sources of FIG. 7a, even though the larger array has a larger average distance from the optic axis. Thus both the size and the homogeneity of the distribution within the entrance aperture contribute to the final output mixing.

Figure 11A:
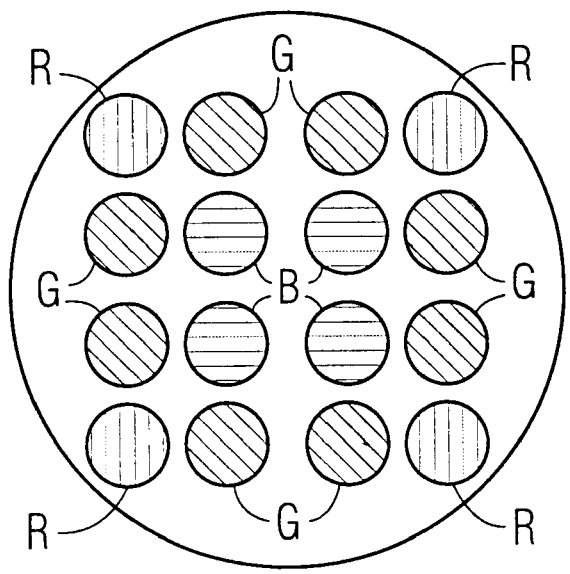
FIG. 11a is a plan view of a square array of sixteen LEDs.
Figure 11B:
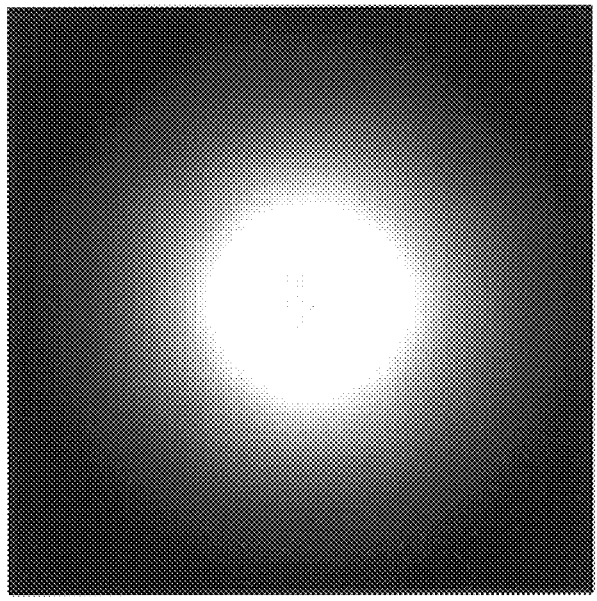
FIG. 11b illustrates the resulting light distribution in a horn reflector with a round cross-section.

FIG. 11b shows the light distribution for a horn with a round cross-section, with sixteen LEDs arranged in the square array of FIG. 11a. Mixing is poor, due to preservation of azimuthal identity of incident rays. An annular yellow artifact appears around the center, with reds toward the corners and green adjacent the midpoints of the sidewalls.

Figure 12A:
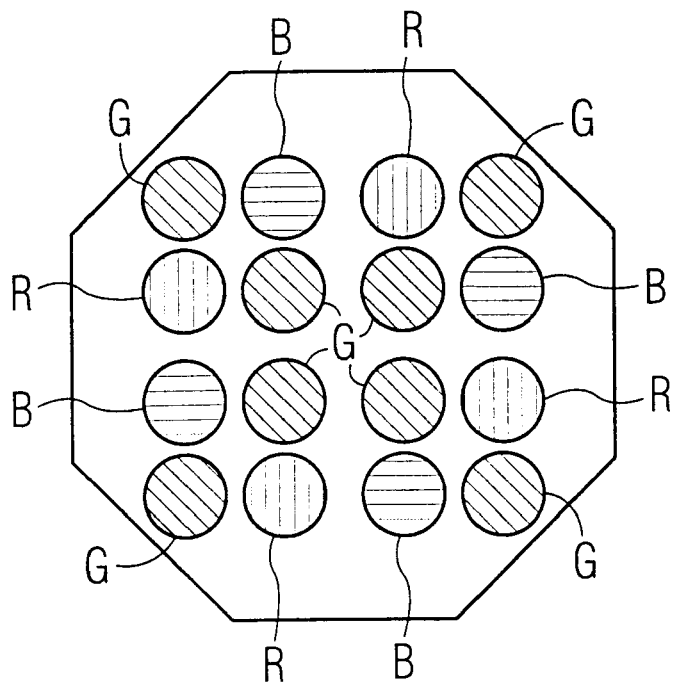
FIG. 12a is a plan view of a square array of sixteen LEDs.
Figure 12B:
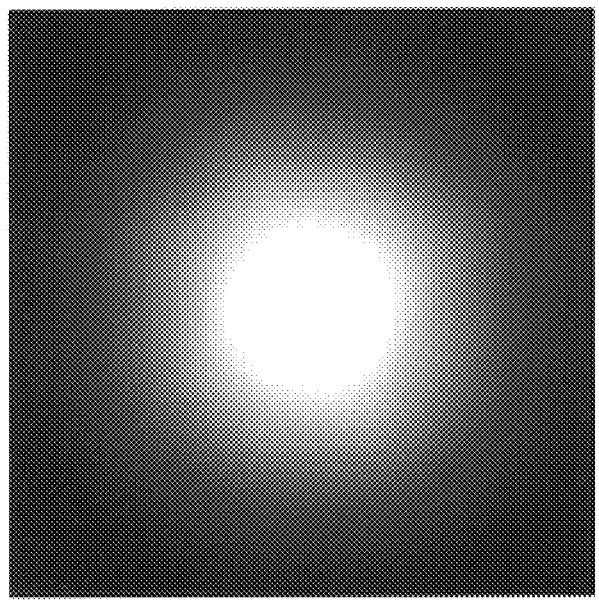
FIG. 12b illustrates the resulting light distribution in a horn reflector with an octagonal cross-section.

FIG. 12b shows the light distribution for a horn with an octagonal cross-section, with sixteen LEDs arranged in the square array of FIG. 12a. Mixing is much better than the round cross-section of FIG. 11, but not quite as good as the square cross-section of FIG. 7. However the octagonal shape gives a much rounder overall beam shape than the square, which may be an important feature to the consumer.

The efficiency η of an optical system as described above can be written as: $\eta = R^N \times T$, where R is the reflectivity of the reflector material, N is the average number of reflections that a ray makes before exiting, and T is the transmissivity of the cover plate on the exit aperture. Using the ASAP plate and taking R=0.9 (measured value for Alanod® Miro 7® foil), N=1.5 and so η=0.85 for a square horn with no diffusive cover. Therefore efficiency η=0.79 with a commercial diffuser having a measured transmissivity of T=0.92. Prototype data agreed with the simulations within the accuracy of the measurements. Note that diffusers have not been described in any detail herein since their primary functions are mechanical protection, optical diffusion, and steering; their design choice will depend on the overall requirements of the system.

The foregoing is exemplary and not intended to limit the scope of the claims which follow.

What is claimed is:

1. A light source comprising:
   an array of LEDs arranged in a hexagonal array and comprising at least one LED in each of a plurality of colors for emitting light in each of a plurality of colors, wherein the array of LEds comprises green, red and blue LEDs and the number of green LEDs is greater than the number of red LEDs which is greater than the number of blue LEDs, and
   a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs.

2. A light source as in claim 1 wherein said circumferential wall has a cross section transverse to said optic axis, said cross-section being substantially non-round along at least a part of said optic axis.

3. A light source as in claim 2 wherein said cross-section is polygonal, said circumferential wall comprising a plurality of sidewalls which are substantially straight in said cross section.

4. A light source as in claim 3 wherein said cross section is square.

5. A light source as in claim 3 wherein said cross-section is octagonal.

6. A light source as in claim 1 wherein said circumferential wall diverges from said entrance aperture to said exit aperture.

7. A light source as in claim 6 wherein said circumferential wall, seen from said optic axis, has a convex shape.

8. A light source as in claim 7 wherein said circumferential wall flares outward toward said exit aperture.

9. A light source as in claim 1 wherein the LEDs in each color define a color distribution having a center of gravity lying on the optic axis.

10. A light source as in claim 9 wherein each color distribution has the same mean radial distance from the optic axis.

11. A light source as in claim 1 further comprising a diffusive cover on the exit aperture.

12. A light source as in claim 1 wherein said reflective circumferential wall is made of a specular-plus-diffuse reflecting material.

13. A light source as claimed in claim 1 wherein the number of LEDs present in said array of LEDs of at least one of said plurality of colors is different from the number of LEDs of at least one other of said plurality of colors.

14. A light source as claimed in claim 1, wherein the green, red and blue LEDs are present in the ratio of colors R:G:B=2:3:1.

15. A light source as claimed in claim 1 further comprising means for controlling the intensity of light emitted by said LEDs and controlling the color temperature thereof throughout the range of light intensity control.

16. A light source comprising:
   an array of LEDs comprising at least one LED in each of a plurality of colors for emitting light in each of a plurality of colors, and
   a reflecting tube having an entrance aperture, an exit aperture, a reflective circumferental wall extending between said apertures, and an optic axis extending between said apertures centrally of said wall, said array of LEDs being arranged in said entrance aperture, said circumferential wall being arranged to reflect and mix light from said array of LEDs, wherein said circumferential wall has a square cross-section transverse to said optic axis, and wherein the array of LEDs comprises green, red and blue LEDs arranged in a square array and present in the ratio of colors R:G:B=1:2:1.

17. A light source comprising:

an array of LEDs comprising at least one LED in each of a plurality of colors for emitting light in each of a plurality of colors, and a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs, wherein said circumferential wall has an octagonal cross-section transverse to said optic axis, and wherein the array of LEDs comprises green, red and blue LEDs arranged in a square array and present in the ratio of colors R:G:B= 1:2:1.

18. A light source comprising:

an array of LEDs comprising at least one LED in each of a plurality of colors for emitting light in each of a plurality of colors, and a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs, wherein said circumferential wall has a cross section transverse to said optic axis, said cross-section being substantially non-round along at least a part of said optic axis, and wherein said circumferential wall comprises at least two approximately parallel walls adjacent the entrance aperture and which flare outward toward said exit aperture.

19. A light source comprising:

an array of LEDs comprising at least one LED in each of a plurality of colors for emitting light in each of a plurality of colors, and a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs, wherein said circumferential wall has a cross section transverse to said optic axis, said cross-section being substantially non-round along at least a part of said optic axis, and wherein said cross-section is a polygonal along substantially the entire length of the optic axis and said circumferential wall diverges from said entrance aperture to said exit aperture such that the exit aperture is larger than the entrance aperture.

* * * * *